E. BAYLISS, J. O. BROWN & F. T. LOMONT.
Harvesting-Machines.

No. 143,609. Patented Oct. 14, 1873.

Witnesses.

Inventors,
Edwin Bayliss
James O. Brown
Francois T. Lomont
by A. M. Smith
Attorney

UNITED STATES PATENT OFFICE.

EDWIN BAYLISS, JAMES O. BROWN, AND FRANÇOIS T. LOMONT, OF MASSILLON, OHIO, ASSIGNORS TO THEMSELVES AND PLINY F. HODGES, OF SAME PLACE.

IMPROVEMENT IN HARVESTING-MACHINES.

Specification forming part of Letters Patent No. 143,609, dated October 14, 1873; application filed January 17, 1873.

*To all whom it may concern:*

Be it known that we, EDWIN BAYLISS, JAMES O. BROWN, and FRANÇOIS T. LOMONT, all of Massillon, county of Stark, State of Ohio, have invented a new and useful Improvement in Harvesting-Machines, of which the following is a full, clear, and exact description, reference being had to the accompanying drawings making part of this specification, in which—

Figure 1:
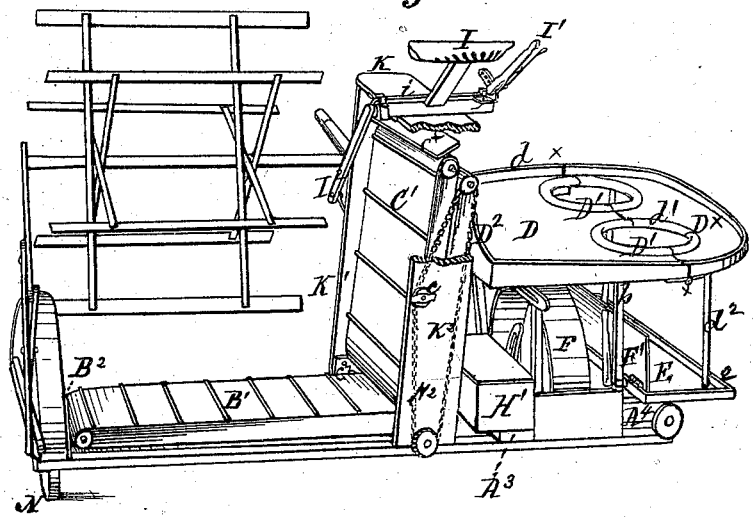
Figure 2:
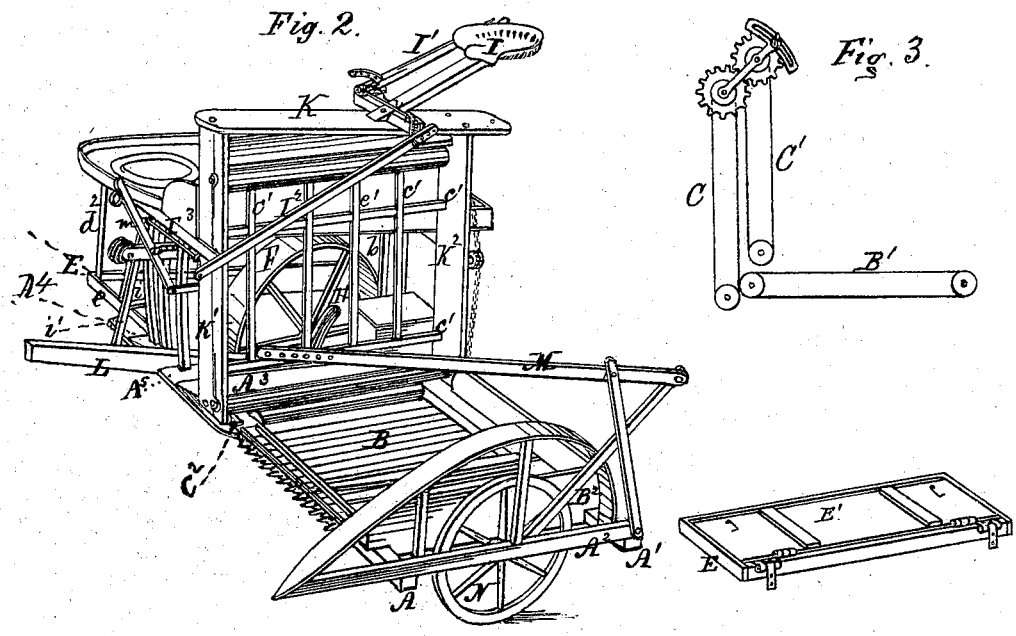
Figure 3:
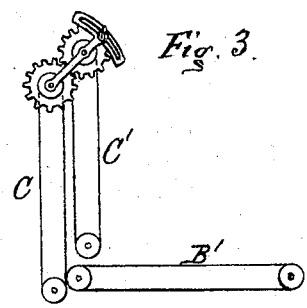

Figure 1 is a perspective view taken from the rear of the machine, with a portion of the elevator-frame broken away to show the elevator-aprons and chute-board. Fig. 2 is a perspective view taken from the front, with the canvas aprons removed. Fig. 3 is a front elevation, showing the arrangement of the belts or canvases.

The invention relates to that class of machines upon which the binders ride for the purpose of binding the grain as it is cut; and consists in certain details of construction, which will be fully explained.

In the drawings, A is the front sill, and $A^1$ the rear sill, each extending the entire length of the machine, and, with the outer girt $A^2$, inner girt $A^3$, and gear-plank $A^4$, constitute the main frame-work, upon which the working parts of the machine are mounted. B (see Fig. 2) is a flooring underneath the carrying-apron $B^1$, extending from the sill $A^3$ to the end board $B^2$, and forming a grain-box, or receptacle to receive the shattered grain and heads, and to protect the canvases. C $C^1$ are the slatted elevator-aprons. The rollers at the upper ends of these aprons are connected with each other by cogged gears, and are driven in opposite directions, at equal or substantially equal speeds, by a belt or chain, $C^2$, from any convenient driving-pulley or sheave. $c$ is a tightening-pulley, employed to give the requisite tension to the driving-belt. The lower end of elevating-apron C extends, by preference, a short distance below the upper surface of the carrying-apron $B^1$, in order that the grain may be readily picked up between the two vertical aprons as fast as it is delivered to them by aprons $B^1$; and the upper end of apron $C^1$ is somewhat higher than the upper end of apron C, so that the grain, after passing upward with and between these aprons C and $C^1$, may easily escape toward the binders' table D. The equal, or substantially equal, speeds of the two aprons C $C^1$ prevent friction and the shelling of grain. $c^\times$ is a chute-board, arranged in an inclined position above the elevating-aprons, for the purpose of deflecting the grain and insuring its proper delivery to the binders. We prefer to support this chute-board upon pivots placed at each end, and to secure it at any desired angle relative to the elevating-apron, as the condition of the grain may require. The rollers of apron $C^1$ may be mounted at their front ends in horizontal, or nearly horizontal, slots, and are pressed toward the rollers of apron C by springs, which permit them to yield to accommodate bunches of grain, weeds, or grass. We do not consider this construction essential at the rear end of the lower roller of apron $C^1$. In fact we have found that the grain is straightened and delivered in a better manner by having the rear end of this roller placed as close to that of apron C as may be, and still permit the grain to pass. As it is sometimes desired to make the upper end of apron C adjustable horizontally relative to aprons $C^1$, we propose to mount the upper roller of apron C in arms which vibrate about the upper roller of apron $C^1$, (or in slots which shall be the equivalent of such arms,) in such manner that the aprons may spread apart without throwing the driving-gears out of mesh. The roller may be held in position, when adjusted, by set-screws. For the purpose of stiffening the elevator-frame, and of supporting the apron C against undue deflection or bagging, we employ a rack of bars, $c^1$, (see Fig. 2,) arranged between the two parallel sides of the apron, the horizontal bars being framed into the vertical posts of the elevator. $c^2$ is an angle-iron, to support the front elevator-post at some distance forward of the carrying-belt $B^1$. D $D^\times$ is the binding-table, provided with apertures $D^1$ $D^1$, in which the binders stand, or place their legs when they sit on the outer portion of the table. $D^2$ is a guide-board or fender, placed in a vertical position, in as close proximity as possible to the apron C, to prevent the grain from being drawn from the table by the outer portion of said apron. $d^\times$ is a rim extending around the edge of the table, and $d^1$ are similar rims or ribs around the holes $D^1$, to prevent the escape of such thrashed grain and heads as may accumulate upon the table. The binding-table is made in two parts, as indicated at $x\ x$, the portion $D^x$ being hinged to the portion D, and supported in a working position by posts $d^2$ from a foot-platform, E, which will be described.

In Fig. 3 the foot-platform is removed from its position on the machine to show more plainly the construction and relation of parts. F is the main driving-gear and carrying-wheel, provided with spurred rim $F'$. G is a bevel-wheel keyed to shaft G, and driving the crank-shaft $g$ through crank-pinion $g'$, these parts being of any usual or preferred description. Wheel F is mounted on an axle, the ends of which have bearings in lever $f$, pivoted on a line coincident with the axis of shaft G. H are slotted segments forming arcs, the centers of which are also coincident with the axis of shaft G, and serving, in connection with levers $f$, to support the stubble end of the machine at any desired height from the ground, the levers being locked to the segment by set-screws or their equivalents. The foot-platform E is placed upon the gear-plank $B^4$, and secured thereto by detachable hinge-fastenings, in such manner that it (the platform) can be removed, or can be swung up against the posts $b\ b$ when the machine is passing through a gateway, or it is desired to get access to the crank-shaft, secondary shaft, or gearing which is mounted on the gear-plank and is covered by the platform. $E'$ is a vertical wing-board hinged to the inner edge of platform E, and serving as a guard to prevent the feet of the binders from coming in contact with the driving-wheel E. When the machine is at work the wing-board is secured to posts $b$ by hooks or their equivalent, and is smaller than platform E, so that it can be folded closely upon said platform within the rim or flange $e$. $H'$ is the tool-box. I is the driver's seat, supported upon the top board or cap K of the elevator-frame. $I^1$ is a hand-lever arranged within convenient reach of the driver, and connected with one end of a rock-shaft, $i$. A link, $I^2$, connects the opposite end of the crank-shaft or rock-shaft with a second crank-shaft, $I^3$, and a link, $i'$, connects the opposite end of this second crank-shaft with the pivoted tongue L. By means of these levers, crank-shafts, and links, the driver can tilt or rock the machine upon the carrying-wheel F and grain-wheel N, as will be readily understood by reference to the drawings without further explanation. M is the outer reel-bearer, and $m$ the inner one. The grain when cut is carried toward the stubble end of the machine by the apron $B^1$, which is driven by any usual mechanism. From the inner end of this apron it is taken by the elevating-aprons C $C^1$ and delivered to the binders. As it passes from the upper end of the elevator it strikes the chute-board $c^x$, and is thereby deflected from a vertical path and thrown upon the table D. The hinges by which the two portions of the binders' table are united are placed on its under side, so that the part $D^x$ will hang down when the posts $d^2$ are removed, in order that the platform E can be folded up against posts $b$, and kept in place by the weight of the part $D^x$ hanging against it. The tool-box H should not be made so wide as the space between the elevator and the drive-wheel, it being desired to leave a space for such shattered grain and heads as may be carried up by apron C, and are not thrown on the table, to fall into the receptacle formed by the floor B.

We regard making the two longitudinal sills A $A^1$ to extend the entire length of the machine as being of great importance, because it makes the frame-work very stiff, and is much cheaper than those constructions in which the corresponding sills are made in two pieces and then bolted together.

As the machine is sometimes tilted forward to get the cutters down near the ground, it occasionally happens it is difficult to pass obstructions which are met in the path traveled by the driving-wheel, because the squared girt will not easily surmount and slide over stones or hillocks of earth. For the purpose of remedying this difficulty we extend the gear-plank and girt at the stubble end of the machine a short distance in front of the girt, and then place a board, $A^5$, in an inclined position, extending from the lower edge of the girt A to the upper edge of the gear-plank and girt, or thereabout, forming a shoe to assist the front of the machine in mounting obstructions.

Having thus described our invention, we claim—

1. The hinged binders' platform E, provided with the hinged wing-board or guard $E'$, substantially as set forth.

2. The combination of the hinged binders' platform E with the binders' table D $D^x$, the part $D^x$ being hinged, as shown, so that it can be let down into a vertical position and secure the platform in position when the parts are folded for transportation.

3. In combination with the elevating-aprons C $C^1$, the pivoted chute-board $c^x$, arranged over the upper roller of the outer apron $C^1$, and adapted to be set at any required angle for deflecting the grain, substantially as set forth.

In testimony whereof we have hereunto set our hands this 30th day of December, A. D. 1872.

EDWIN BAYLISS.
    JAS. O. BROWN.
    FRANÇOIS T. LOMONT.

Witnesses:
 E. HOFFMAN,
 W. F. RUDENSTEIN.